(12) United States Patent
Kong et al.

(10) Patent No.: US 12,320,664 B2
(45) Date of Patent: Jun. 3, 2025

(54) VEHICULAR DRIVING GUIDANCE METHOD AND ELECTRONIC DEVICE

(71) Applicant: SAMSUNG ELECTRONICS CO., LTD., Suwon-si (KR)

(72) Inventors: Jinah Kong, Suwon-si (KR); Dohyoung Kim, Suwon-si (KR); Yongjun Lim, Suwon-si (KR); Kyusung Kim, Suwon-si (KR); Jaeyeon Rho, Suwon-si (KR); Juyeon You, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 125 days.

(21) Appl. No.: 17/958,128

(22) Filed: Sep. 30, 2022

(65) Prior Publication Data
US 2023/0024275 A1    Jan. 26, 2023

Related U.S. Application Data

(63) Continuation of application No. PCT/KR2021/001947, filed on Feb. 16, 2021.

(30) Foreign Application Priority Data

Apr. 1, 2020 (KR) .................. 10-2020-0039811

(51) Int. Cl.
*G01C 21/36* (2006.01)
*G01C 21/34* (2006.01)

(52) U.S. Cl.
CPC ..... *G01C 21/3691* (2013.01); *G01C 21/3492* (2013.01); *G01C 21/365* (2013.01); *G01C 21/367* (2013.01); *G01C 21/3697* (2013.01)

(58) Field of Classification Search
CPC ............ G01C 21/3691; G01C 21/3492; G01C 21/365; G01C 21/367; G01C 21/3697;
(Continued)

(56) References Cited

U.S. PATENT DOCUMENTS 9,739,632 B2    8/2017    van Dok et al.
10,240,937 B2   3/2019    Chung et al.
(Continued)

FOREIGN PATENT DOCUMENTS

CN    104823022    8/2015
CN    106205175    12/2016
(Continued)

OTHER PUBLICATIONS

Extended European Search Report dated Aug. 29, 2023 issued in European Patent Application No. 21779896.6.
(Continued)

*Primary Examiner* — Nga X Nguyen
(74) *Attorney, Agent, or Firm* — Nixon & Vanderhye, P.C.

(57) ABSTRACT

An electronic device may include: a communication module comprising communication circuitry, a processor operatively coupled to the communication module, and a memory storing instructions operatively coupled to the processor. The instructions, when executed, may cause the processor to: obtain driving route traffic information of a first driving route of a vehicle connected to the electronic device, analyze the first driving route traffic information and determine a traffic event occurrence requiring a change in a driving route or a driving lane of the vehicle connected to the electronic device, based on the traffic event occurring, determine a severity level of the traffic event based on a driving time increase and an accident risk, and control a display device to display at least one of line change information, lane change
(Continued)

information and a traffic sign corresponding to the severity level on a display device.

16 Claims, 16 Drawing Sheets

(58) Field of Classification Search
CPC ............ G01C 21/3415; G01C 21/3461; G01C 21/3632; G01C 21/3658
See application file for complete search history.

(56) References Cited

U.S. PATENT DOCUMENTS

| | | | |
|---|---|---|---|
| 10,679,499 | B2 | 6/2020 | Kwon |
| 10,877,481 | B2 | 12/2020 | You et al. |
| 2007/0010941 | A1 | 1/2007 | Marsh |
| 2015/0247737 | A1 | 9/2015 | Van Dok et al. |
| 2016/0349066 | A1 | 12/2016 | Chung et al. |
| 2016/0379485 | A1* | 12/2016 | Anastassov .......... G08G 1/0129 701/117 |
| 2018/0058879 | A1 | 3/2018 | Tayama et al. |
| 2018/0105040 | A1* | 4/2018 | Ryu .................. G08G 1/096791 |
| 2018/0299291 | A1* | 10/2018 | Thomas .............. G01C 21/3694 |
| 2022/0390245 | A1* | 12/2022 | Konrardy ............... B60R 25/305 |

FOREIGN PATENT DOCUMENTS

| | | | |
|---|---|---|---|
| CN | 110910668 | | 3/2020 |
| JP | 2004-132897 | | 4/2004 |
| JP | 2004132897 | A * | 4/2004 |
| JP | 2018-200626 | | 12/2018 |
| KR | 10-2010-0019692 | | 2/2010 |
| KR | 10-0957137 | | 5/2010 |
| KR | 10-2015-0070208 | | 6/2015 |
| KR | 10-1750159 | | 6/2017 |
| KR | 10-2188637 | | 12/2020 |
| WO | 2010/098554 | | 9/2010 |
| WO | 2015/144746 | | 10/2015 |

OTHER PUBLICATIONS

Office Action dated Dec. 31, 2024 in Chinese Patent Application No. 202180026589.0 and English-language translation.
Communication under Rule 71(3) EPD dated Apr. 8, 2025 in European Application No. 21779896.6.

* cited by examiner (Green)  (Yellow)  (Red)

VEHICULAR DRIVING GUIDANCE METHOD AND ELECTRONIC DEVICE

CROSS-REFERENCE TO RELATED APPLICATIONS

This application is a continuation of International Application No. PCT/KR2021/001947, designating the United States, filed on Feb. 16, 2021, in the Korean Intellectual Property Receiving Office and claiming priority to Korean Patent Application No. 10-2020-0039811, filed on Apr. 1, 2020, in the Korean Intellectual Property Office, the disclosures of which are incorporated by reference herein in their entireties.

BACKGROUND

Field

The disclosure relates to a vehicular driving guidance method and an electronic device based on driving route traffic information.

Description of Related Art

A navigation technology is used to guide a driving route and to shorten a driving time. The navigation technology which guides the vehicular driving route may display the driving route from a current location to a destination according to a preset standard, and calculate and display the driving time on a display. The vehicle navigation technology may receive traffic information in real time using a communication device, search for the current location of the vehicle using a global positioning system (GPS) device, search for the destination on a map, calculate the driving route from the current location of the vehicle to the destination, and guide the driving route and the required time through a display device (including a sound device). This navigation technology may be limited to recommending the driving route and guiding an estimated driving time on a previously set map. Conventional navigation technology may not guide an accident between vehicles occurring on the road, a vehicle breakdown, a road damage, driving information of other nearby vehicles, driving route change based on traffic device information, and traffic event occurrence information.

SUMMARY

Embodiments of the disclosure may provide a vehicular driving guidance method and an electronic device based on driving route traffic information for guiding driving line change, driving route change and traffic event information based on unexpected traffic event (an accident between vehicles, a vehicle breakdown, road damage) information on a road and driving information of other vehicles, and traffic device information.

According to various example embodiments, an electronic device may include: a communication module comprising communication circuitry, a processor operatively coupled to the communication module, and a memory operatively coupled to the processor. The memory may include executable program instructions which, when executed, control the processor to: obtain driving route traffic information of a first driving route of a vehicle connected to the electronic device, analyze the first driving route traffic information and determine traffic event occurrence requiring a change in a driving route or a driving lane of the vehicle connected to the electronic device, based on the traffic event occurring, determine a severity level of the traffic event based on a driving time increase and an accident risk, and display at least one of line change information, lane change information and a traffic sign corresponding to the severity level on a display device.

The processor of the electronic device according to various example embodiments of the present disclosure may, while driving on the first driving route, determine the severity to a first level based on the driving time increasing less than a first increment or there being no accident risk, and while driving on the first driving route, determine the severity to a second level based on the driving time increasing above the first increment or an accident risk being expected.

The processor of the electronic device according to various example embodiments of the present disclosure may, acquire a current location of the vehicle connected to the electronic device, obtain a distance difference between the vehicle connected to the electronic device and an occurrence point of the traffic event, and control the display device to display at least one of the line change information, the lane change information and the traffic sign on the display device based on the distance difference.

The processor of the electronic device according to various example embodiments of the present disclosure may, control the display device to display at least one of first line change information, first lane change information and a first traffic sign corresponding to the severity of the first level on the display device.

The processor of the electronic device according to various example embodiments of the present disclosure may, control the display device to display the first driving route corresponding to the severity of the first level and a second driving route newly recommended on the display device.

The processor of the electronic device according to various example embodiments of the present disclosure may, control the display device to display the first driving route and the second driving route differently.

The processor of the electronic device according to various example embodiments of the present disclosure may, control the display device to display at least one of second line change information configured to force a change in the line, second lane change information configured to force a change in the lane and a second traffic sign on the display device in response to the severity of the second level.

The processor of the electronic device according to various example embodiments of the present disclosure may, control the display device to display the first driving route as an impossible driving route, and to display the second driving route newly recommended on the display device in response to the severity of the second level.

The processor of the electronic device according to various example embodiments of the present disclosure may, control the display device to display the first traffic sign and the second traffic sign in different colors.

The processor of the electronic device according to various example embodiments of the present disclosure may, classify types of the traffic event into an accident between vehicles, vehicle breakdown, road control, ambulance driving, fire truck driving, exit warning, entry warning, soil runoff, oil spill, flooding, icing, pot hole, road kill, falling object, road construction, and tunnel collapse, and control to display the traffic sign corresponding to the type of the traffic event on the display device.

The processor of the electronic device according to various example embodiments of the present disclosure may, control the display device to display at least one of the line change information, the lane change information and the traffic sign corresponding to the severity level in at least one of a flat display manner, two dimension augmented reality (AR) head-up display (HUD) manner, a three dimension AR HUD manner, a virtual reality (VR) manner, and a hologram manner.

The processor of the electronic device according to various example embodiments of the present disclosure may, recognize driving routes of a plurality of companion vehicles for a same destination, and based on a specific vehicle among the plurality of the companion vehicles having the same destination changes the driving route regardless of the destination travel route, control the display device to display driving route changes of the specific vehicle on the display device.

According to various example embodiments, a vehicular driving guidance method may, include: collecting driving route traffic information of a first driving route of a vehicle connected to an electronic device, analyzing the first driving route traffic information and determining traffic event occurrence requiring to change a driving route or a driving lane of the vehicle connected to the electronic device, based on the traffic event occurring, determine a severity of the traffic event based on a driving time increase and an accident risk, and control a display device to display at least one of line change information, lane change information and a traffic sign corresponding to a level of the severity on a display device.

The vehicular driving guidance method according to various example embodiments of the present disclosure may, in determining the severity level, while driving on the first driving route, determine the severity to a first level based on the driving time increasing less than a first increment or there being no accident risk, and while driving on the first driving route, determine the severity to a second level based on the driving time increasing above the first increment or an accident risk being expected.

The vehicular driving guidance method according to various example embodiments of the present disclosure may, acquire a current location of the vehicle connected to the electronic device, obtain a distance difference between the vehicle connected to the electronic device and an occurrence point of the traffic event, and control the display device to display at least one of the line change information, the lane change information and the traffic sign based on the distance difference.

The vehicular driving guidance method according to various example embodiments of the present disclosure may, control the display device to display at least one of first line change information, first lane change information and a first traffic sign corresponding to the severity of the first level on the display device, and display the first driving route corresponding to the severity of the first level and a second driving route newly recommended on the display device.

The vehicular driving guidance method according to various example embodiments of the present disclosure may, control the display device to display the first driving route and the second driving route differently.

The vehicular driving guidance method according to various example embodiments of the present disclosure may, control the display device to display at least one of second line change information configured to force a change in the line, second lane change information configured to force a change in the lane and a second traffic sign on the display device in response to the severity of the second level, and to display the first driving route as an impossible driving route, and to display the second driving route newly recommended on the display device in response to the severity of the second level.

The vehicular driving guidance method according to various example embodiments of the present disclosure may, control the display device to display the first traffic sign and the second traffic sign in different colors.

The vehicular driving guidance method according to various example embodiments of the present disclosure may, recognize driving routes of a plurality of companion vehicles for a same destination, and based on a specific vehicle among the plurality of the companion vehicles having the same destination changing the driving route regardless of the destination travel route, control the display device to display driving route changes of the specific vehicle on the display device.

According to various example embodiments of the present disclosure, provided are a vehicular driving guidance method and an electronic device based on driving route traffic information for guiding driving line change, driving route change and traffic event information based on unexpected traffic event (an accident between vehicles, a vehicle breakdown, road damage) information on a road and driving information of other vehicles, and traffic device information.

Besides, various effects directly or indirectly obtained through this disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With regard to the description of the drawings, the same or similar reference numerals may be used for the same or similar components.

DETAILED DESCRIPTION

Figure 1:
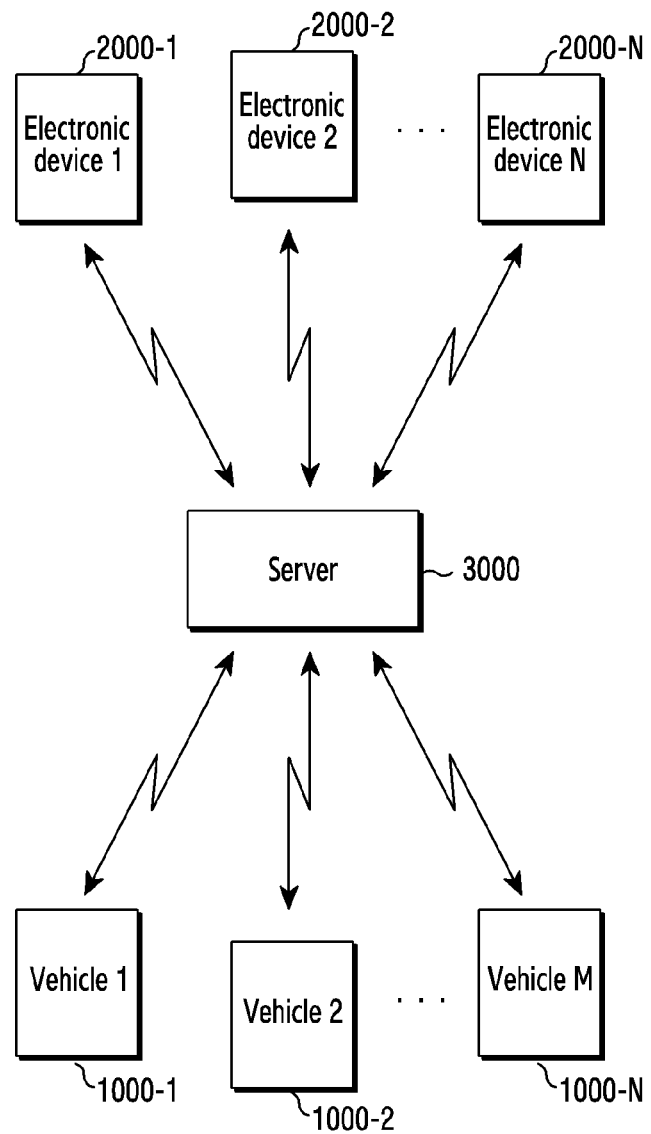
FIG. 1 is a diagram illustrating a vehicular driving guidance system based on driving route traffic information according to various embodiments.

Hereinafter, various example embodiments of the present disclosure will be described in greater detail with reference to the accompanying drawings. Components shown in the drawings may be exaggerated or reduced in size for convenience of description, and the present disclosure is not necessarily limited to the illustrated ones.

FIG. 1 is a diagram illustrating an example vehicular driving guidance system based on driving route traffic information according to various embodiments.

Referring to FIG. 1, the vehicular driving guidance system may include a plurality of vehicles 1000-1, 1000-2, and 1000-N, a plurality of electronic devices 2000-1, 2000-2, and 2000-N, and a server 3000. The plurality of the vehicles 1000-1, 1000-2, and 1000-N each may include an electronic device (e.g., an electronic device 100 of FIG. 3, or an electronic device 100-1 of FIG. 4) for guiding to change a lane or a driving route based on the driving route traffic information.

The electronic device (e.g., the electronic device 100 of FIG. 3 or the electronic device 100-1 of FIG. 4) disposed in the plurality of the vehicles 1000-1, 1000-2, and 1000-N may display information of the lane or driving route change. Herein, the electronic device (e.g., the electronic device 100 of FIG. 3, or the electronic device 100-1 of FIG. 4) may display the lane change information and/or the driving route change information in a two dimension augmented reality (AR) head-up display (HUD) manner, a three dimension AR HUD manner, a virtual reality (VR) manner, a hologram manner, or a flat display (e.g., a liquid crystal display (LCD), an organic LED (OLED)) manner.

The plurality of the electronic devices 2000-1, 2000-2, and 2000-N each may include a wired/wireless communication function, and transmit driving route traffic information (e.g., social data) including traffic information to the server 3000. In the disclosure, the social data including the traffic information may be referred to as 'driving route traffic information'.

Vehicle to vehicle (V2V) traffic information may include traffic data transmitted and received between vehicles. The driving route traffic information may indicate information obtained by extracting traffic related information from various social data transmitted and received between a plurality of users in addition to the V2V traffic information. In an embodiment, if a first user transmits to a second user a message that 'I am moving from Gangnam Station to Seolleung Station, but vehicles are congested due to road damage', the electronic device (e.g., the electronic device 100 of FIG. 4A) and/or the server 3000 may extract traffic related data (e.g., Gangnam Station, Seolleung Station, road, damage, and vehicle congestion) from the message transmitted by the first user. The electronic device (e.g., the electronic device 100 of FIG. 4A) and/or the server 3000 may transmit the driving route traffic information to a vehicle traveling on the same driving route.

The plurality of the electronic devices 2000-1, 2000-2, and 2000-N each may include, for example, and without limitation, a communication device, a smartphone, a tablet personal computer (PC), a PC, a smart television (TV), a mobile phone, a personal digital assistant (PDA), a notebook computer, a laptop computer, a media player, a micro server, a global positioning system (GPS) device, an e-book terminal, a digital broadcasting terminal, a navigation device, another computing device, or the like. Also, the plurality of the electronic devices 2000-1, 2000-2, and 2000-N each may be a wearable device (e.g., a watch, glasses, a hair band, and a ring) including a display function and a data processing function. In addition, the plurality of the electronic devices 2000-1, 2000-2, and 2000-N each may be a traffic signal device (e.g., a traffic light, a traffic control device, a traffic information display device).

The driving route traffic information may include data that users transmit traffic information such as a vehicle driving state, driving information, road information, traffic condition, accident occurrence situation, driving delay in the form of voice, a message, or a video using the plurality of the electronic devices 2000-1, 2000-2, and 2000-N and social network services (SNS). The driving route traffic information may include vehicle information, route information, lane information, and driving information from the plurality of the vehicles 1000-1, 1000-2, and 1000-N. In addition, the driving route traffic information may include data from a traffic signal device (e.g., a traffic light, a traffic control device, a traffic information display device). For example, the driving route traffic information may indicate broad traffic information related to the driving of the vehicle.

The plurality of the vehicles 1000-1, 1000-2, and 1000-N may transmit and receive the driving information including the traffic condition using vehicle to pedestrian (V2P), V2V, and vehicle to everything (V2X) based on a 4th (4G) communication system or a 5th (5G) communication system.

The plurality of the electronic devices 2000-1, 2000-2, and 2000-N may transmit the driving route traffic information including the traffic condition to the server 3000 using V2P, V2X, and vehicle to infra (V2I) communications.

The plurality of the electronic devices 2000-1, 2000-2, and 2000-N may receive the driving route traffic information including the traffic conditions of the plurality of the vehicles 1000-1, 1000-2, and 1000-N using V2P, V2X, and V2I communications.

The plurality of the vehicles 1000-1, 1000-2, and 1000-N each may transmit its driving route traffic information including the traffic condition to the server 3000 using V2X and V2I communications.

The plurality of the vehicles 1000-1, 1000-2, and 1000-N may receive the driving route traffic information including the traffic condition, driving information of other vehicles, and road condition information from the server 3000 using V2X and V2I communications.

Figure 2:
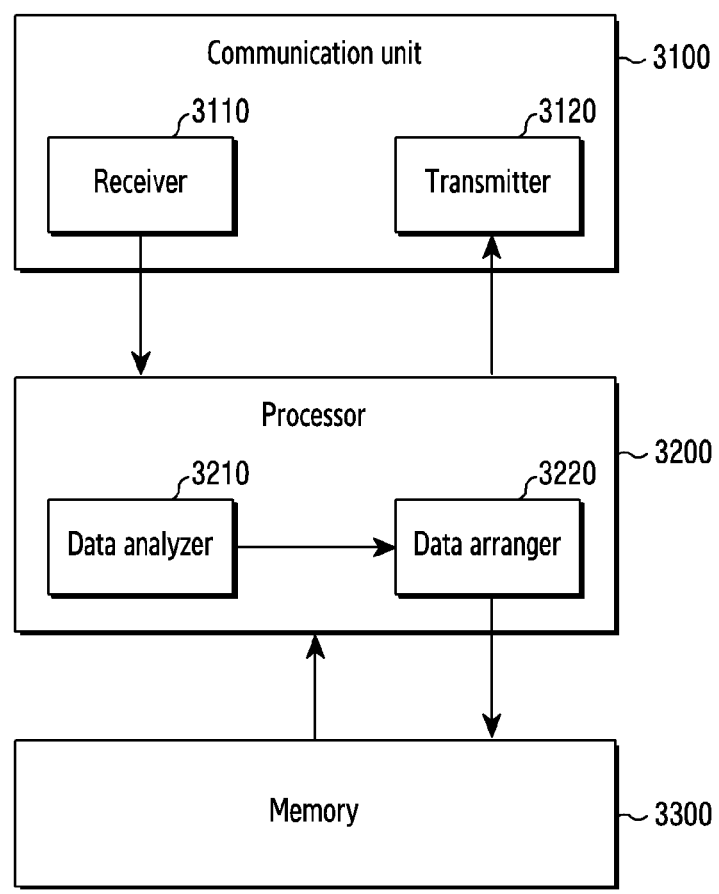
FIG. 2 is a block diagram illustrating an example configuration of a server shown in FIG. 1 according to various embodiments.

FIG. 2 is a block diagram illustrating an example configuration of a server 3000 shown in FIG. 1 according to various embodiments.

Referring to FIG. 2, the server 3000 may include a communication unit (e.g., including communication circuitry) 3100, a processor (e.g., including processing circuitry) 3200, and a memory 3300.

The communication unit 3100 may include various communication circuitry, including a receiver 3110 for receiving a radio signal and a transmitter 3120 for outputting a radio signal. The server 3000 may transmit/receive driving route traffic information to/from the plurality of the vehicles 1000-1, 1000-2, and 1000-N and the plurality of the electronic devices 2000-1, 2000-2, and 2000-N through the communication unit 3100.

The processor 3200 may include various processing circuitry including a data analyzer 3210 and a data arranger 3220. The data analyzer 3210 may analyze whether data received from the plurality of the vehicles 1000-1, 1000-2, and 1000-N and the plurality of the electronic devices 2000-1, 2000-2, and 2000-N includes traffic information. The data analyzer 3210 may classify each traffic information in the driving route traffic information, and provide the classification result of the driving route traffic information to the data arranger 3220.

The data arranger 3220 may include various processing circuitry and/or executable program instructions and sort the received classification results of the driving route traffic information based on a preset criterion. As an example, the data arranger 3220 may sort the driving route traffic information based on driving information (e.g., a location, a speed, a starting point, a target point, a driving direction, a driving route, a driving lane, etc.) of each vehicle. The data arranger 3220 may sort the driving route traffic information based on the road, and road conditions (e.g., soil runoff, oil spill, flooding, icing, pot hole, road kill, falling object, road construction, and tunnel collapse, etc.). The data arranger 3220 may sort the driving route traffic information based on the traffic signal device (e.g., a traffic light, a traffic control device, a traffic information display device).

The data arranger 3220 may transmit the sorted driving route traffic information to the plurality of the vehicles 1000-1, 1000-2, and 1000-N through the transmitter 3120. As an example, the data arranger 3220 may transmit every driving route traffic information the transmitter 3120 to the plurality of the vehicles 1000-1, 1000-2, and 1000-N in common. As an example, the data arranger 3220 may distinguish vehicles of the same or similar driving routes among the plurality of the vehicles 1000-1, 1000-2, and 1000-N. Specific driving route traffic information among the entire driving route traffic information may be transmitted to the vehicles having the same or similar driving route. For example, the driving vehicle may receive the driving route traffic information corresponding to its traveling road, lane, and driving route from the server 3000.

The memory 3300 may store the data (e.g., driving route traffic information) received from the plurality of the vehicles 1000-1, 1000-2, and 1000-N and the plurality of the electronic devices 2000-1, 2000-2, and 2000-N. The memory 3300 may store various data used by the processor 3200 of the server 3000. The data may include, for example, software (e.g., a program), and input data or output data of instructions related thereto. The memory 3300 may include a volatile memory and a non-volatile memory.

Figure 3A:
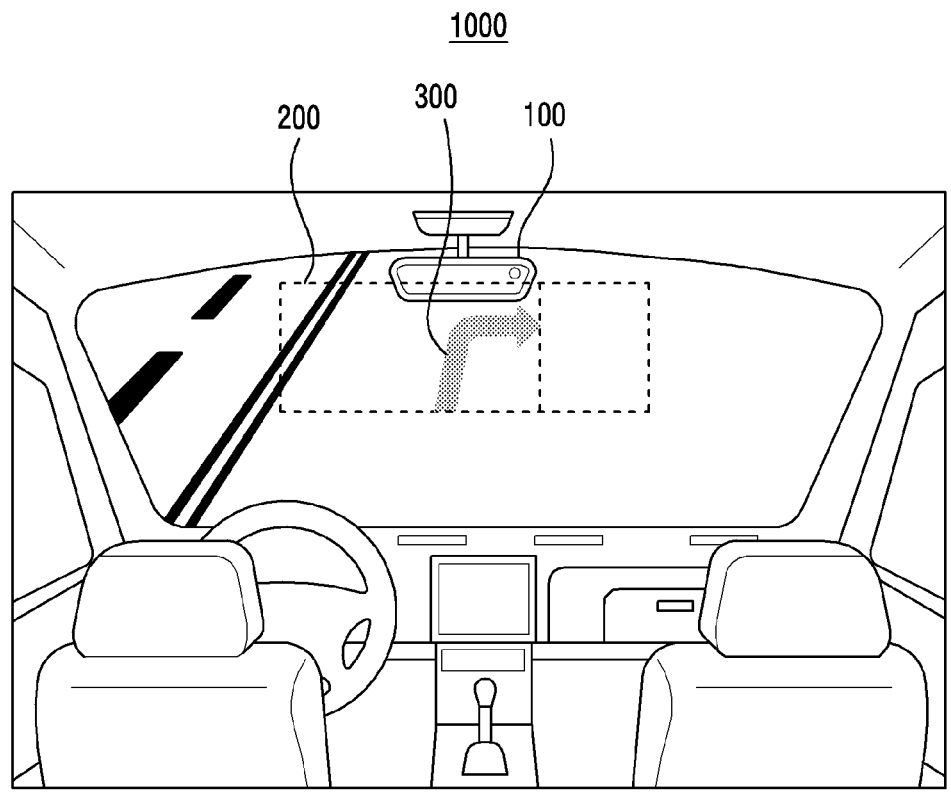
FIG. 3A is a diagram illustrating an example in which an electronic device is applied to a vehicle according to various embodiments.

FIG. 3A is a diagram illustrating an example in which an electronic device 100 is applied to a vehicle 1000 according to various embodiments.

Referring to FIG. 3A, the vehicle 1000 may include the electronic device 100 for displaying traffic guidance information 300 (e.g., line change information, lane change information, traffic sign and/or traffic event information) based on driving route traffic information. The electronic device 100 may display the traffic guidance information 300 (e.g., line change information, lane change information, traffic sign and/or traffic event information) on a window 200 of the vehicle 1000 in the AR HUD manner.

The HUD manner may display the traffic guidance information 300 by projecting an image onto the front window 200 of the vehicle 1000. By displaying the information on the front window 200 of the vehicle 1000, the driver may recognize the traffic guidance information 300 while keeping his/her eyes on the road. It is not limited thereto, and the electronic device 100 may display the traffic guidance information 300 (e.g., line change information, lane change information, traffic sign and/or traffic event information) in a mirror display manner.

In an embodiment, the electronic device 100 may display the traffic guidance information 300 (e.g., line change information, lane change information, traffic sign and/or traffic event information) on the window 200 of the vehicle 1000 in at least one of the two dimension three dimension AR HUD manner, the VR manner and the hologram manner. As another example, the electronic device 100 may display the traffic guidance information 300 (e.g., line change information, lane change information, traffic sign and/or traffic event information) in the flat display manner.

The electronic device 100 may be a mobile or non-mobile electronic device which may be mounted on the vehicle 1000. The electronic device 100 may include an image sensor for acquiring a situation outside the vehicle as an image, and a GPS for acquiring location information of the vehicle 1000. The electronic device 100 may be operatively connected with a navigation device, a driving control device, an autonomous driving system and an advanced driver assistance system (ADAS) of the vehicle 1000, and thus share driving state, driving lane, driving route, starting point, target point information of the vehicle 1000, and/or a traffic event occurrence point.

Figure 3B:
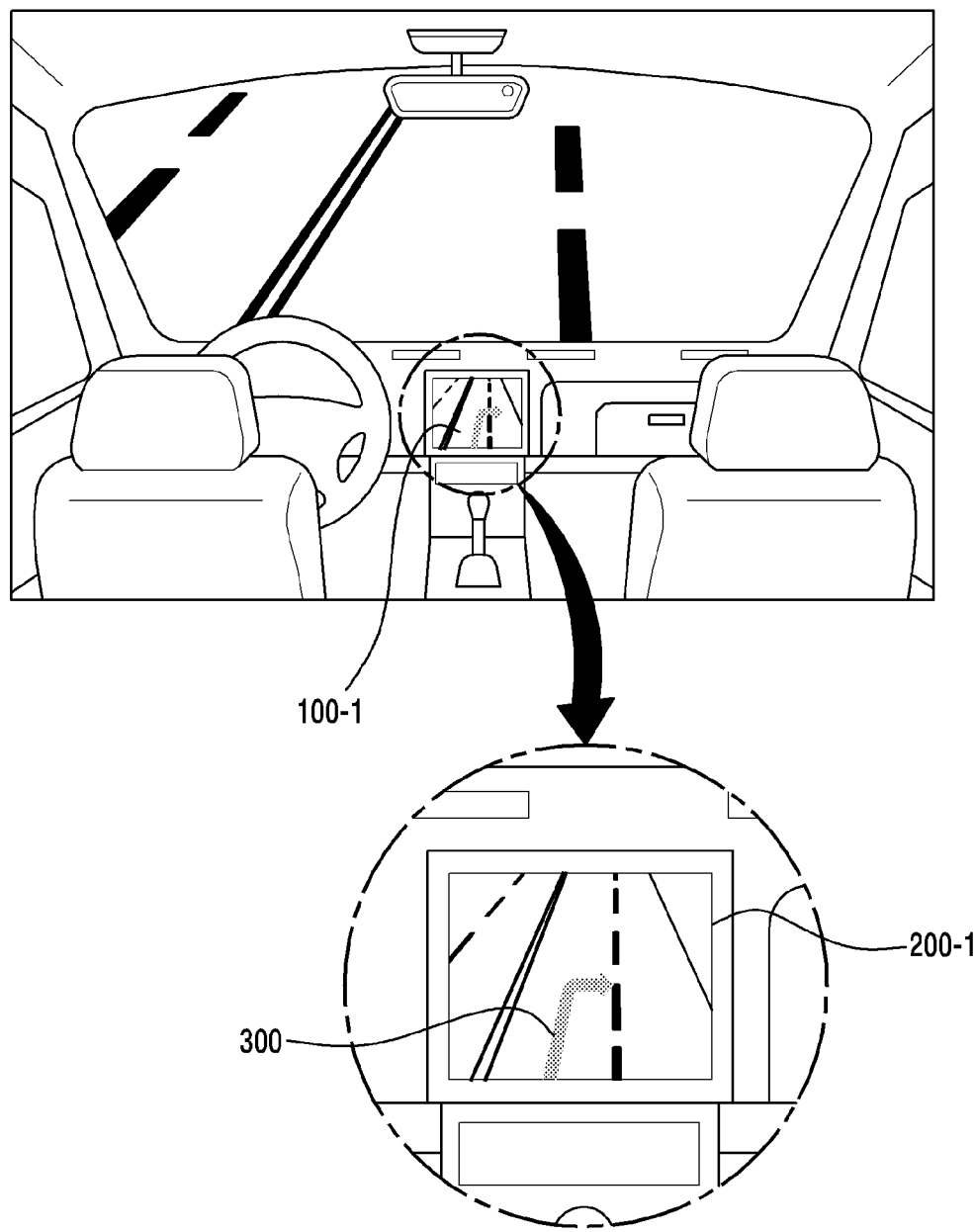
FIG. 3B is a diagram illustrating an example in which an electronic device is applied to a vehicle according to various embodiments.

FIG. 3B is a diagram illustrating an example in which an electronic device 100-1 is applied to the vehicle 1000 according to various embodiments.

Referring to FIG. 3B, the vehicle 1000 may include the electronic device 100-1 for displaying the traffic guidance information 300 (e.g., line change information, lane change information, traffic sign and/or traffic event information) based on the driving route traffic information. The electronic device 100-1 may display the traffic guidance information 300 (e.g., line change information, lane change information, traffic sign and/or traffic event information) in the flat panel display (e.g., LCD, OLED) manner.

Figure 4A:
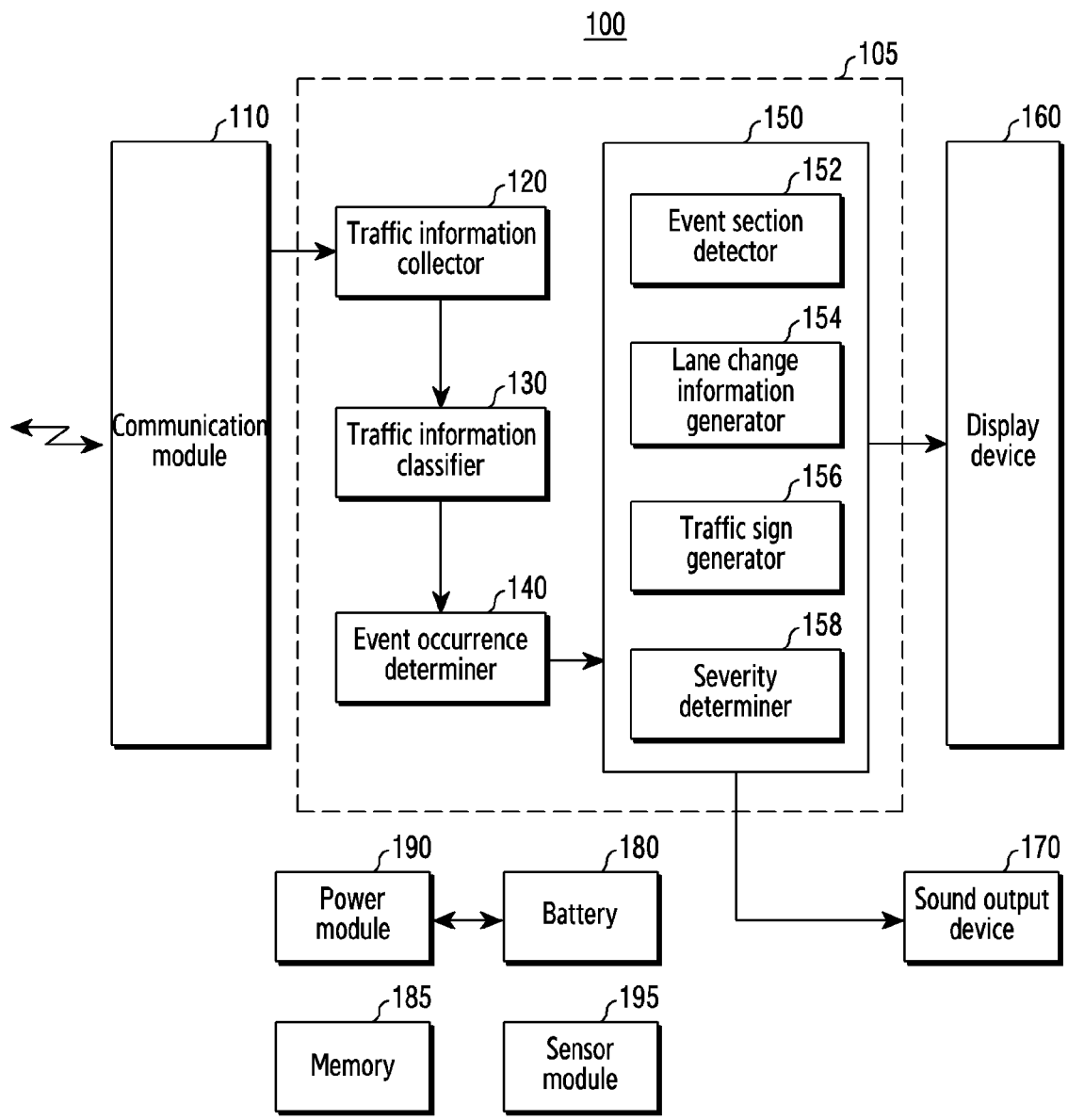
FIG. 4A is a block diagram illustrating an example configuration of an electronic device according to various embodiments.

The electronic device 100 of FIG. 3A or the electronic device 100-1 of FIG. 4A may recognize lanes on the road while driving and thus recognize the number of the lanes on the road. The electronic device 100 and 100-1 may recognize a currently traveling lane among the plurality of the lanes. The electronic device 100 and 100-1 may display the traffic guidance information 300 (e.g., line change information, lane change information, traffic sign and/or traffic event information) on a flat display 200-1 based on the traveling lane.

The electronic device 100 and 100-1 may include, for example, a sensor module (e.g., including at least one sensor) 195 (refer to FIG. 4A), to increase accuracy of the line and lane determination. The sensor module 195 may include an image sensor, a radar sensor, and a LIDAR sensor. The electronic device 100 and 100-1 may recognize the line and the lane using sensing information from the image sensor, the radar sensor, and the LIDAR sensor. It is not limited thereto, and it may be assumed that information related to the number of lanes and the lines for each road on which the vehicle 1000 is traveling is already included in map data of the navigation, or may be included in a separate database. The electronic device 100 may use the information related to the number of the lanes and the lines for each driving road included in the map data of the navigation, or the separate database.

The electronic device 100 and 100-1 may display the traffic guidance information 300 (e.g., line change information, lane change information, traffic sign and/or traffic event information) in the two dimension AR HUD manner, the three dimension AR HUD manner, the VR manner, the hologram manner, or the flat display manner. As an example, the AR is a technology which displays a three-dimensional virtual object overlaid on the real world viewed by the driver with his/her eyes, and may be called mixed reality (MR), which shows one image by merging the virtual object having additional information and the real world in real time.

If the vehicle 1000 needs to change the driving lane, the electronic device 100 and 100-1 may determine it as traffic event (e.g., an accident between vehicles, vehicle breakdown, road control, ambulance driving, fire truck driving, exit warning, entry warning, and road conditions (soil runoff, oil spill, flooding, icing, pot hole, road kill, falling object, road construction, and tunnel collapse) occurrence, and display the traffic event information on the flat panel display 200-1.

The traffic guidance information 300 displayed through the electronic device 100 and 100-1 may include not only the traffic event information, but also a driving speed of the vehicle 1000, a speed limit of the traveling road, and road control information according to weather conditions.

Although the electronic device 100 and 100-1 is illustrated as the separate device from the vehicle 1000 in FIG. 3A and FIG. 3B, but it is not limited thereto. The electronic device the electronic device 100 and 100-1 may be integrated into the vehicle 1000 and implemented as a configuration included in the vehicle 1000. For example, the electronic device 100 and 100-1 may include a processor (e.g., a processor 105 of FIG. 4A) included in the vehicle 1000. For example, the processor (e.g., the processor 105 of FIG. 4A) may include a micro controller unit (MCU) included in the vehicle 1000. Also, the vehicle 1000 may include a memory (e.g., a memory 185 of FIG. 4A) for storing data required for the processor to operate and the driving route traffic information. In addition, the vehicle 1000 may include a communication module (e.g., a communication module 110 of FIG. 4A) for communicating with external electronic devices, and other vehicles.

FIG. 4A is a block diagram illustrating an example configuration of an electronic device 100 according to various embodiments.

Referring to FIG. 4A, the electronic device 100 may include a processor (e.g., including processing circuitry) 105, a communication module (e.g., including communication circuitry) 110, a display device (e.g., including a display) 160, a sound output device (e.g., including sound output circuitry) 170, a battery 180, a memory 185, a power module (e.g., including power management circuitry) 190, and a sensor module (e.g., including at least one sensor) 195. The processor 105 may include various processing circuitry and/or executable program instructions including, for example, a traffic information collector 120, a traffic information classifier 130, an event occurrence determiner 140, and a controller 150.

Figure 4B:
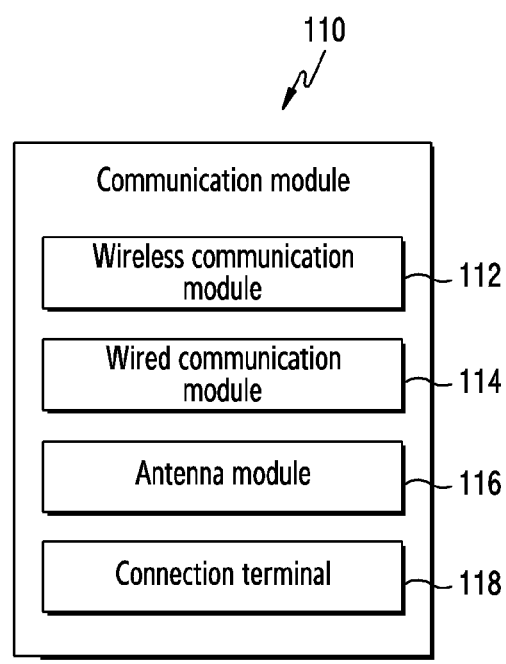
FIG. 4B is a block diagram illustrating an example configuration of a communication module of an electronic device shown in FIG. 4A according to various embodiments.

FIG. 4B is a block diagram illustrating an example configuration of the communication module 110 of the electronic device 100 shown in FIG. 4A according to various embodiments.

Referring to FIG. 4B, the communication module 110 may include a wireless communication module (e.g., including wireless communication circuitry) 112 (e.g., a cellular communication module, a short-range wireless communication module, or a global navigation satellite system (GNSS) communication module), a wired communication module (e.g., including wired communication circuitry) 114, an antenna module (e.g., including at least one antenna) 116, and a connection terminal 118.

The communication module 110 may include various communication circuitry and establish a direct (e.g., wired) communication channel or a wireless communication channel between the electronic device 100 and an external electronic device, another vehicle, and a server (e.g., the server 3000 of FIG. 1), and support communication over the established communication channel. The communication module 110 may include one or more communication processors which support the direct (e.g., wired) communication or the wireless communication.

The communication module 110 may communicate with the external other electronic device, other vehicles, and the server (the server 3000 of FIG. 1) over a first network (e.g., a long distance communication network such as a cellular network, Internet, or a computer network (e.g., local area network (LAN) or wide area network (WAN)), or a second network (e.g., a short distance communication network such as Bluetooth, wireless fidelity (WiFi) direct or infrared data association (IrDA)). The wireless communication modules 112, and the wired communication modules 114 of various types may be integrated into one component (e.g., a single chip), or may be implemented as a plurality of separate components (e.g., a plurality of chips).

The wireless communication module 112 may include various wireless communication circuitry and identify and authenticate the electronic device 100 within the communication network such as the first network or the second network using communication subscriber information (e.g., international mobile subscriber identifier (IMSI)).

The antenna module 116 may include at least one antenna and transmit and/or receive a signal or power to outside (e.g., an external electronic device) from outside. According to an embodiment, the antenna module may include one antenna including a conductor formed on a substrate (e.g., a printed circuit board PCB)) or a radiator formed in a conductive pattern. According to an embodiment, the antenna module 116 may include a plurality of antennas. In this case, at least one antenna adequate for the communication manner used in the communication network such as the first network or the second network may be selected from the plurality of the antennas by, for example, the communication module 110. The signal or the power may be transmitted or received between the communication module 110 and the external electronic device, other vehicles, and the server (the server 3000 of FIG. 1) via the at least one selected antenna. According to various embodiments, besides the radiator, another component (e.g., a radio frequency integrated circuit (RFIC)) may be additionally formed as a part of the antenna module 116.

At least some of the components may be connected to each other in a communication manner between peripheral devices (e.g., a bus, general purpose input and output (GPIO), serial peripheral interface (SPI), or mobile industry processor interface (MIPI)) and exchange signals (e.g., commands or data). According to an embodiment, a command or data may be transmitted or received between the electronic device 100 and the external electronic device, and other vehicles via the server (the server 3000 of FIG. 1) connected to the first network or the second network.

The connection terminal 118 may include a connector for electrically connecting the electronic device 100 to the external electronic device. According to an embodiment, the connection terminal 118 may include, for example, a high definition multimedia interface (HDMI) connector, a universal serial bus (USB) connector, a secure digital (SD) card connector, or an audio connector (e.g., a headphone connector).

Referring back to FIG. 4A, the traffic information collector 120 of the processor 105 may receive the driving route traffic information from the server (e.g., the server 3000 of FIG. 1) through the communication module 110 in real time. It is not limited thereto, and the traffic information collector 120 may receive data from external electronic devices (e.g., the plurality of the electronic devices 2000-1, 2000-2, and 2000-N of FIG. 1), and other vehicles (e.g., the plurality of the vehicles 1000-1, 1000-2, and 1000-M of FIG. 1). The traffic information collector 120 may provide the driving route traffic information received in real time and the data to the traffic information classifier 130. The traffic information collector 120 may store the received driving route traffic information in the memory 185.

The traffic information classifier 130 of the processor 105 may analyze the driving route traffic information received in real time, and classify specific driving route traffic information corresponding to the driving route, and the driving lane of the vehicle 1000. The traffic information classifying unit 130 may provide the specific driving route traffic information corresponding to the driving route, and the driving lane of the vehicle 1000 to the event occurrence determiner 140.

The event occurrence determiner 140 of the processor 105 may analyze the received driving route traffic information and thus determine whether it is necessary to the driving route of the vehicle 1000, or to change the driving lane of the vehicle 1000. For example, the event generation determiner 140 may determine whether a traffic event has occurred to change the driving route of the vehicle 1000, or to change the driving lane of the vehicle 1000. The traffic event may include, for example, and without limitation, an accident between vehicles, vehicle breakdown, road control, ambulance driving, fire truck driving, exit warning, entry warning and road conditions (soil runoff, oil spill, flooding, icing, pot hole, road kill, falling object, road construction, tunnel collapse, etc. The event occurrence determiner 140 may generate traffic event information, if the traffic event occurs, and provide the generated traffic event information to the controller 150.

The controller 160 of the processor 105 may include an event section detector 152, a lane change information generator 154, a traffic sign generator 156, and a severity determiner 158, each of which may include various processing circuitry and/or executable program instructions.

The event section detector 152 may recognize a point where the traffic event occurs by analyzing the received traffic event information, and calculate a distance from a current location of the vehicle 1000 to the point where the traffic event occurs. In addition, the event section detector 152 may analyze the received traffic event information and thus determine a traffic event type (e.g., an accident between vehicles, vehicle breakdown, road control, ambulance driving, fire truck driving, exit warning, entry warning, and road conditions (soil runoff, oil spill, flooding, icing, pot hole, road kill, falling object, road construction, and tunnel collapse).

The event section detector 152 may generate event section information including information of how many meters (M) ahead (e.g., 500M ahead) (e.g., recognizing a distance difference between a driver's own vehicle (e.g., a vehicle connected with the electronic device) and the traffic event occurrence point) the traffic event requiring the molding route change or the lane change of the vehicle 1000 occurs based on the traffic event point and the distance to the traffic event occurrence point, and the traffic event type. The event section detector 152 may provide the generated event section information to the severity determiner 158. Also, the event section detector 152 may provide the event section information to the lane change information generator 154 and the traffic sign generator 156.

The severity determiner 158 may determine severity of the generated event based on the received event section information.

The severity determiner 158 may determine a severity level of the traffic event in consideration of a driving time increase due to the traffic event occurrence. Specifically, if an expected arrival time to the destination increases in driving along the previously guided driving route due to the traffic event occurrence, the severity determiner 158 may determine the severity level of the traffic event according to the increase of the expected arrival time. Also, the severity determination unit 158 may determine the severity level of the traffic event by considering an accident risk based on the traffic event occurrence. Specifically, if the accident risk is expected in driving along the previously guided driving route, the severity determiner 158 may determine the severity level of the traffic event in consideration of the accident risk.

As an example, the severity determiner 158 may classify to severity low (e.g., severity of a first level) (e.g., a severity first level) having low severity of the occurred traffic event. Specifically, if the expected arrival time to the destination increases below a first increment (e.g., 20%) in driving along the previously guided driving route due to the occurrence of the traffic event, the severity determiner 158 may classify to the severity low (e.g., the severity first level). It is not limited thereto, and the severity determiner 158 may classify to the severity low (e.g., the severity first level), if the expected arrival time to the destination increases below a second increment (e.g., 30-50%).

As an example, the severity determiner 158 may classify to the severity low (e.g., the severity first level), if the severity determiner 158 does not expect the accident risk in driving along the previously guided driving route due to the traffic event occurrence.

As an example, the severity determiner 158 may classify to the severity low (e.g., the severity first level) if it is necessary to change the current driving route or the current driving lane, but a traffic event allowing the driving occurs.

As an example, the severity determiner 158 may classify to the severity high (e.g., the severity second level) of the high severity level of the occurred event. For example, the severity determiner 158 may classify to the severity high (e.g., the severity second level), if the expected arrival time to the destination increases over the first increment (e.g., 20%) in driving along the previously guided driving route due to the traffic event occurrence. It is not limited thereto, and the severity determiner 158 may classify to the severity low (e.g., the severity first level), if the expected arrival time to the destination increases over the second increment (e.g., below 30-50%).

As an example, the severity determiner 158 may classify to the severity high (e.g., the severity second level), if the severity determiner 158 expects the accident risk in driving along the previously guided driving route due to the traffic event occurrence.

As an example, the severity determiner 158 may classify to the severity high (e.g., the severity second level), if a traffic event not allowing the driving on the current driving route or the current driving lane occurs.

The severity determiner 158 may classify the severity of the event, and generate severity information. The severity determiner 158 may provide the severity information to the lane change information generator 154, and the traffic sign generator 156.

The lane change information generator 154 may generate traffic guidance information 300 (e.g., traffic guidance information 300 shown in FIG. 3A, FIG. 3B) for guiding the route change or the lane change based on the received event section information and severity information. The lane change information generator 154 may transmit the generated traffic guidance information 300 (e.g., the traffic guidance information 300 shown in FIG. 3A, FIG. 3B) to the display device 160.

The traffic sign generator 156 may generate a traffic sign (e.g., a traffic sign 400 of FIG. 5) including information of the occurred event, and traffic condition information based on the received event section information and severity information. The traffic sign generator 156 may transmit the generated traffic sign (e.g., the traffic sign 400 of FIG. 5) to the display device 160.

Accordingly, the processor 105 may control the display device to display at least one of the line change information, the lane change information and the traffic sign corresponding to the severity level on the display device.

Figure 4C:
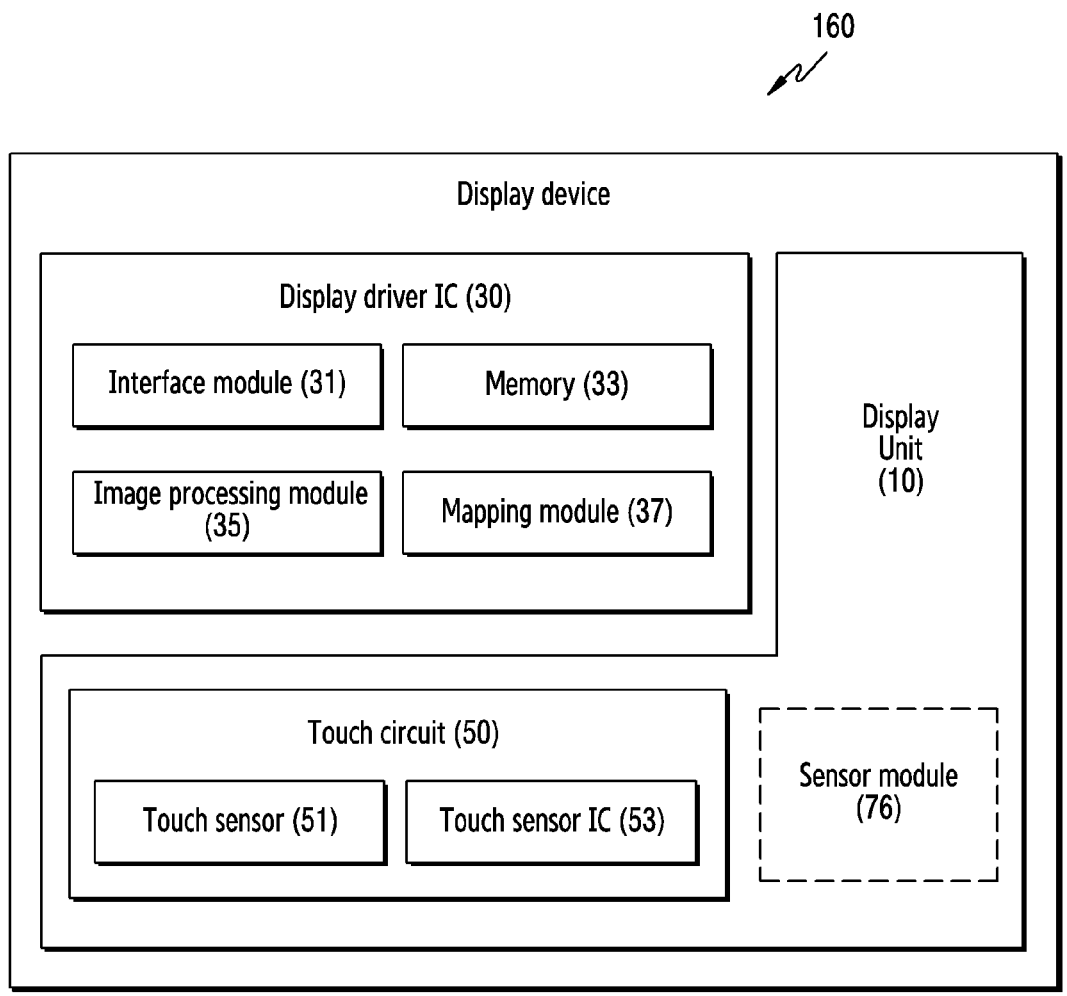
FIG. 4C is a block diagram illustrating an example configuration of a display device of an electronic device shown in FIG. 4A according to various embodiments.

FIG. 4C is a block diagram illustrating an example configuration of the display device 160 of the electronic device 100 shown in FIG. 4A according to various embodiments.

Referring to FIG. 4C, the display device 160 may include a display unit (e.g., including a display panel) 10 for outputting an image, and a display driver IC (DDI) 30 for controlling the display unit 10.

The display device 160 may display the received traffic guidance information 300 (e.g., the traffic guidance information 300 shown in FIG. 3A FIG. 3B), and the traffic sign (e.g., the traffic sign 400 of FIG. 5) through the display unit 10.

As an example, the display unit 10 may display the traffic guidance information 300 (e.g., the traffic guidance information 300 shown in FIG. 3A, FIG. 3B), and the traffic sign (e.g., the traffic sign 400 of FIG. 5), by outputting image beams in the two dimension AR HUD manner, the three dimension AR HUD manner, the VR manner, or the hologram manner. As an example, the display unit 10 may display the traffic guidance information 300 (e.g., the traffic guidance information 300 shown in FIG. 3A, FIG. 3B), and the traffic sign (e.g., the traffic sign 400 of FIG. 5) in the flat display (e.g., LCD, OLED) manner.

The DDI 30 may include an interface module 31, a memory 33 (e.g., a buffer memory), an image processing module 35, and/or a mapping module 37, each of which may include various circuitry and/or executable program instructions. The DDI 30 may receive, for example, image information including image data, or an image control signal corresponding to a command for controlling the image data from other component of the electronic device 100 through the interface module 31. According to an embodiment, the image information may be received from the processor. The DDI 30 may communicate with a touch circuit 50 or a sensor module 76 through the interface module 31. Also, the DDI 30 may store at least part of the received image information in the memory 33, for example, on a frame basis. The image processing module 35 may preprocess or postprocess (e.g., adjust resolution, brightness, or size), for example, at least part of the image data based at least on characteristics of the image data or characteristics of the display unit 10. The mapping module 37 may generate a voltage value or a current value corresponding to the image data preprocessed or postprocessed by the image processing module 35.

According to an embodiment, generation the voltage value or the current value may be performed based on, for example, properties of pixels of the image displayed through the display unit 10. The pixels of the image may be driven based on at least a part of the voltage value or the current value, to thus display visual information (e.g., a text, an image, or an icon) corresponding to the image data through the display unit 10.

According to an embodiment, the display device 160 may further include the touch circuit 50. The touch circuit 50 may include a touch sensor 51 and a touch sensor IC 53 for controlling it. The touch sensor IC 53 may, for example, control the touch sensor 51 to detect a touch input or a hovering input to a specific position of the display unit 10. According to an embodiment, at least a part (e.g., the touch sensor IC 53) of the touch circuit 50 may be included as a part of the display driver IC 30, or the display unit, or a part of other component disposed outside the display device 160.

According to an embodiment, the display device 160 may further include at least one sensor (e.g., a fingerprint sensor, an iris sensor, a pressure sensor or an illuminance sensor) of the sensor module 76, or a control circuit therefor. In this case, the at least one sensor or its control circuit may be embedded in a part of the display device 160 (e.g., the display unit 10 or the DDI 30) or a part of the touch circuit 50.

Referring back to FIG. 4A, the sound output device 170 may output a sound signal to the outside of the electronic device 100. The sound output device 170 may output information of a new recommended route 320 (e.g., a first lane) and a traffic sign 400 shown in FIG. 5 with a sound. The sound output device 170 may include, for example, a speaker or a receiver. The speaker may be used for general purposes such as multimedia playback or recording playback, and the receiver may be used to receive incoming calls. According to an embodiment, the receiver may be implemented separately from or as a part of the speaker.

The battery 180 may supply power to at least one component of the electronic device 100. According to an embodiment, the battery 180 may include, for example, a non-rechargeable primary cell, a rechargeable secondary cell or a fuel cell.

The power module 190 may include various power management circuitry (e.g., including, for example, a PMIC) manage the power supplied to the electronic device 100. According to an embodiment, the power module 190 may include a power connector for receiving alternating current (AC) power or direct current (DC) power. According to an embodiment, the power module 190 may be implemented as at least a part of a power management integrated circuit (PMIC).

Figure 5:
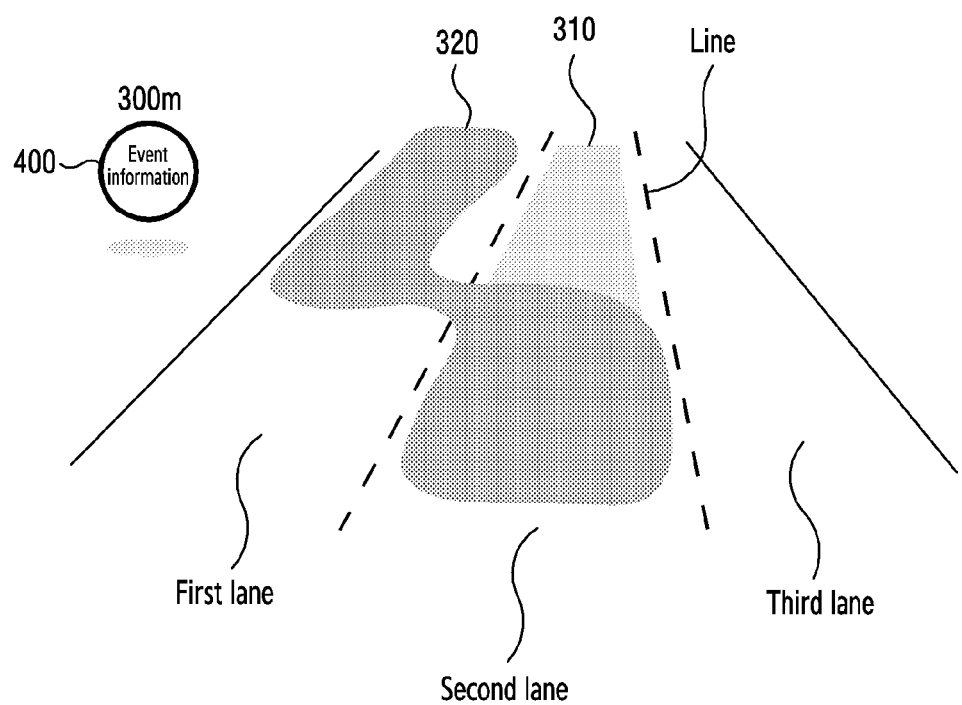
FIG. 5 is a diagram illustrating an example method for displaying an existing route and a new recommended route using an electronic device according to various embodiments.
Figure 6A:
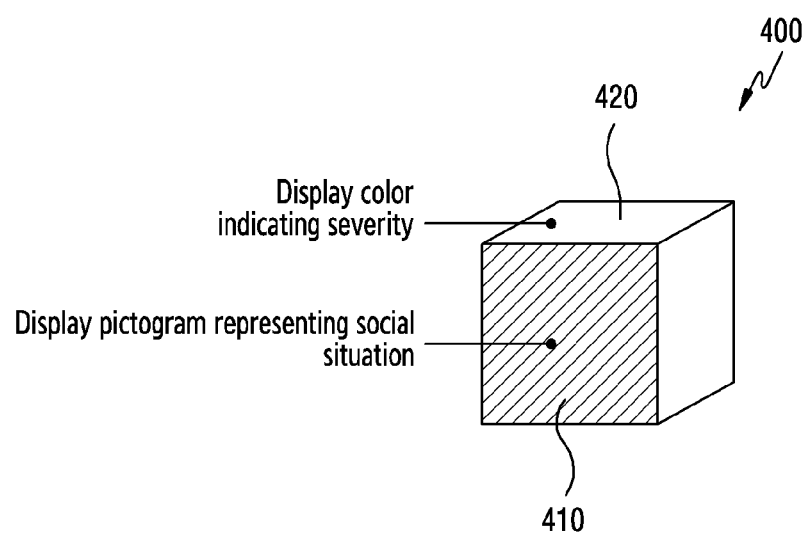
FIG. 6A is a diagram illustrating a sign box displayed according to traffic event occurrence using an electronic device according to various embodiments.

FIG. 5 is a diagram illustrating an example method for displaying an existing route and a new recommended route using an electronic device according to various embodiments. FIG. 6A is a diagram illustrating an example sign box displayed according to traffic event occurrence using an electronic device according to various embodiments.

Referring to FIG. 3A, FIG. 4A, FIG. 5 and FIG. 6A, the electronic device 100 may display the new recommended driving route 320 (e.g., a second driving route) separately from an existing driving route 310 (e.g., a first driving route) based on traffic guidance information 300 (e.g., the traffic guidance information 300 shown in FIG. 3A, FIG. 3B). If the vehicle 1000 traveling in the second lane which is the existing driving route 310 is subject to a driving risk due to event occurrence, or is expected to decrease the driving speed, the electronic device 100 may display the new recommended driving route 320 (e.g., the first lane).

The electronic device 100 may display the existing driving route 310 (e.g., the second lane) and the new recommended driving route 320 (e.g., the first lane) in different colors. As an example, the electronic device 100 may display the existing driving route 310 in a first color, and display the new recommended driving route 320 (e.g., the first lane) in a second color. For example, it may control to display the existing driving route 310 and the new recommended driving route 320 in the different colors on the display device.

The electronic device 100 may display the new recommended driving route 320 (e.g., the first lane) to overlap the existing driving route 310. The new recommended driving route 320 (e.g., the first lane) may include an image, and characters.

The electronic device 100 may display the traffic sign 400 on a portion corresponding to an outer side of the road. The traffic sign 400 may display a distance (e.g., 300 m) from a current vehicle location to an event occurrence point and event details (e.g., accident between vehicles, vehicle breakdown, road control, ambulance driving, fire truck driving, exit warning, entry warning, and road conditions (soil runoff, oil spill, flooding, icing, pot hole, road kill, falling object, road construction, and tunnel collapse).

The traffic sign 400 may include an event information display unit 410 and a severity display unit 420. The event information display unit 410 may display event information for displaying driving route traffic conditions. The severity display unit 420 may display the severity of the traffic event (e.g., the severity low (the severity first level) or the severity high (the severity second level)) in color. However, the disclosure is not limited thereto, and the severity display unit 420 may display the event severity using an image or a character. Such a traffic sign 400 may be displayed in the form of a circle sign board, a hexagonal sign box, or a polyhedral sign box. The traffic sign 400 may include an image, and characters.

Figure 6B:
FIG. 6B is a diagram illustrating that a color of a sign box is changed according to severity of traffic event occurrence according to various embodiments.
Figure 6B:
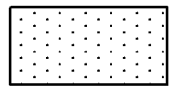
Figure 6B:

FIG. 6B is a diagram illustrating that the color of the sign box may be changed based on the severity of the traffic event occurrence according to various embodiments.

Referring to FIG. 6B, if a traffic event does not occur and general traffic conditions are guided, the severity display unit 420 of the traffic sign 400 may be displayed in a green color. If the severity of the event is low, the severity display unit 420 of the traffic sign 400 may be displayed in a yellow color. If the severity of the event is high, the severity display unit 420 of the traffic sign 400 may be displayed in a red color.

Figure 6C:
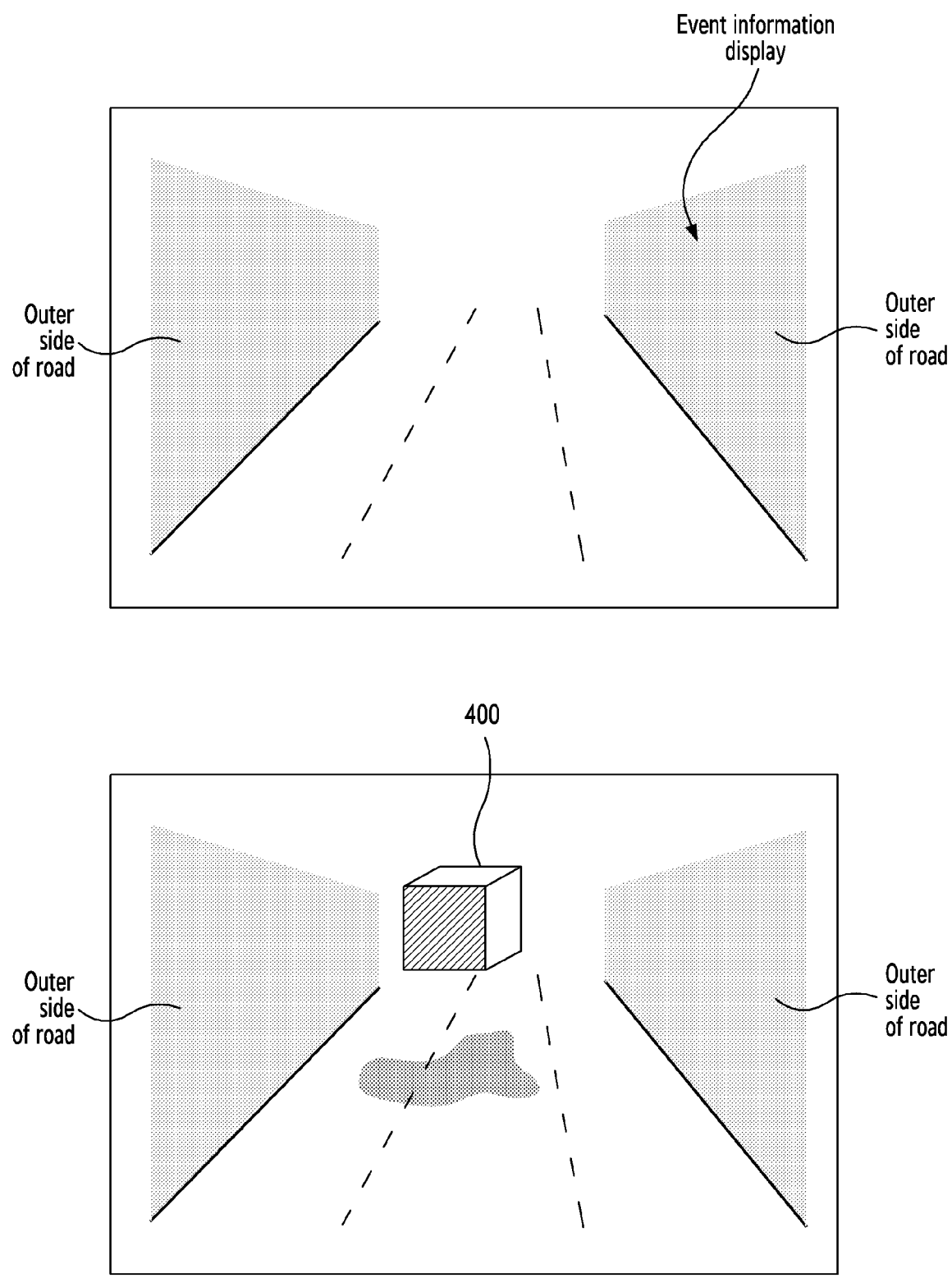
FIG. 6C is a diagram illustrating a position where a sign box is generated according to various embodiments.

FIG. 6C is a diagram illustrating an example position where the sign box is generated according to various embodiments.

Referring to FIG. 3A, FIG. 4A, and FIG. 6C, if an event occurrence point is a specific distance (e.g., 1 Km) or more away from the current location of the vehicle 1000, event information may be displayed on an outer side of the road. If the event occurrence point is less than the preset distance (e.g., 1 Km) from the current location of the vehicle 1000, the traffic sign 400 may be displayed by floating it over the road. As an example, as the vehicle 1000 approaches the event occurrence point, the size of the traffic sign 400 may be gradually increased. As an example, the traffic sign 400 may blink at a constant speed to intuitively recognize the event occurrence.

Figure 7:
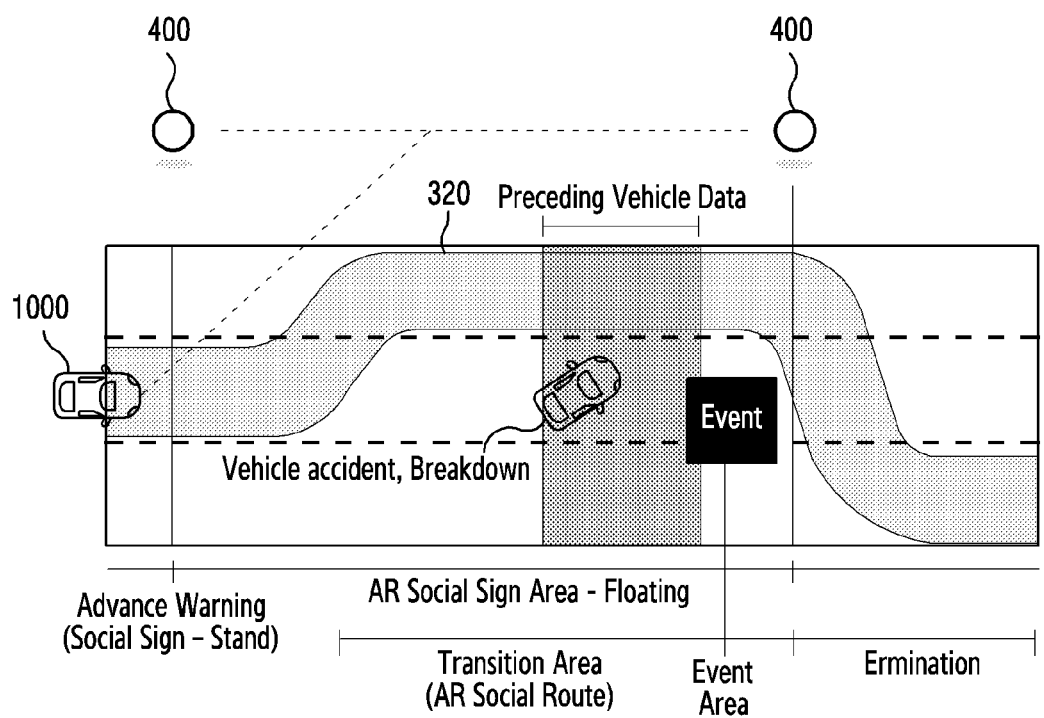
FIG. 7 is a diagram illustrating an example method for guiding a lane change using an electronic device according to various embodiments.

FIG. 7 is a diagram illustrating an example method for guiding a lane change using an electronic device according to various embodiments.

Referring to FIG. 3A, FIG. 4A, and FIG. 7, if the vehicle 1000 may not travel in the existing driving lane (e.g., the second lane) due to a vehicle accident or a vehicle breakdown ahead, the electronic device 100 may display the new vehicle driving route 320 (e.g., the first lane), and guide to the forcible lane change. For example, it may display the impossible driving on the existing driving lane (e.g., the second lane), and information forcing to drive along the new recommended driving route 320 (e.g., the first lane) on the display device.

The electronic device 100 may display the traffic sign 400 on the portion corresponding to the outer side of the road. The traffic sign 400 may display information of the distance to the point where the event occurs and the event. If the vehicle 1000 passes the event point, the electronic device 100 may guide the lane change to drive the vehicle 1000 along the existing lane (e.g., the second lane).

Figure 8:
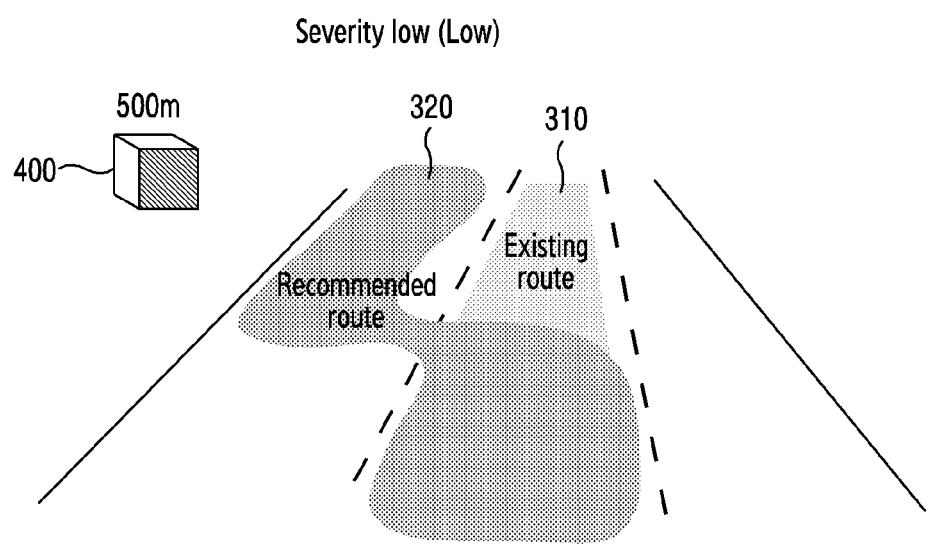
FIG. 8 is a diagram illustrating an example method for guiding a lane change, if a severity of a traffic event occurred is determined to be low according to various embodiments.

FIG. 8 is a diagram illustrating an example method for guiding a lane change, if severity of an event occurred is determined to be low (e.g., the severity first level) according to various embodiments.

Referring to FIG. 3A, FIG. 4A, and FIG. 8, the electronic device 100 may determine the event severity as low if analyzing event information, and expecting that the vehicle 1000 which may travel along the existing driving route 310 is subject to a risk during driving, or is to decrease the speed. For example, the electronic device 100 may classify to the severity low (e.g., the severity first level), if the expected arrival time to the destination increases below the first increment (e.g., 20%) in driving along the previously guided existing driving route due to the traffic event occurrence.

For the low severity, the electronic device 100 may display the new recommended driving route 320 together with the existing driving route 310. In this case, the electronic device 100 may display the existing driving route 310 and the new recommended driving route 320 in different colors.

The electronic device 100 may display the traffic sign 400 indicating the low severity on the portion corresponding to the outer side of the road. The traffic sign 400 may display information (a color, a character, or an image) of the low severity and event details (e.g., accident between vehicles, vehicle breakdown, road control, ambulance driving, fire truck driving, exit warning, entry warning, and road conditions (soil runoff, oil spill, flooding, icing, pot hole, road kill, falling object, road construction, and tunnel collapse).

Figure 9:
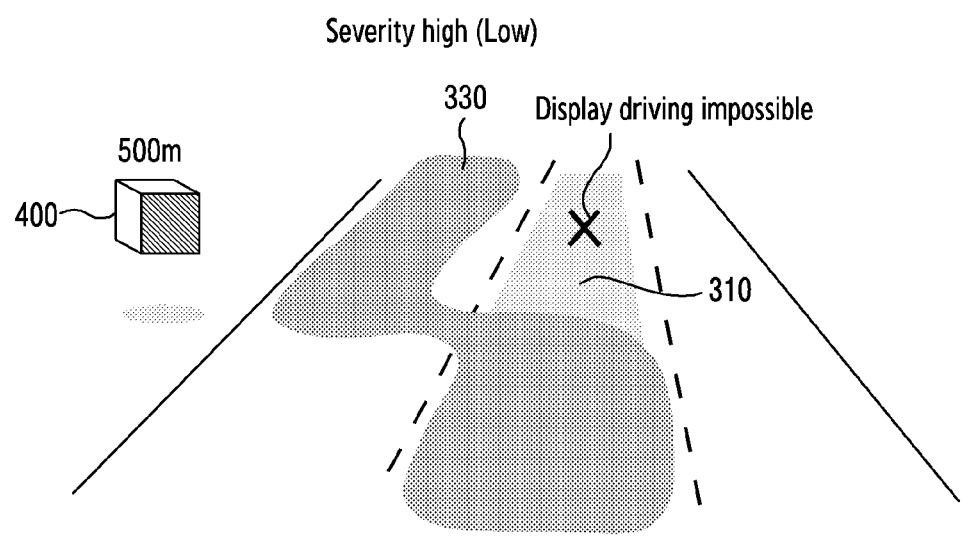
FIG. 9 is a diagram illustrating an example method for guiding a lane change, if a severity of a traffic event occurred is determined to be high according to various embodiments.

FIG. 9 is a diagram illustrating an example method for guiding a lane change, if severity of an event occurred is determined to be high (e.g., the severity second level) according to various embodiments.

Referring to FIG. 3A, FIG. 4A, and FIG. 9, by analyzing the event information, the electronic device 100 may classify to the severity high (e.g., the severity second level) of the event occurred. For example, the electronic device 100 may classify to the severity high (e.g., the severity second level), if the expected arrival time to the destination increases over the first increment (e.g., 20%) in driving along the previously guided existing driving route due to the traffic event occurrence.

By analyzing the event information, the electronic device 100 may determine the severity of the event as high if the vehicle 1000 may not travel on the existing driving route 310.

For the high severity, the electronic device 100 may display a new essential driving route 330 together with the existing driving route 310. In this case, the electronic device 100 may display the existing driving route 310 and the new essential driving route 330 in different colors.

The electronic device 100 may display the traffic sign 400 indicating the high severity on the portion corresponding to the outer side of the road. The traffic sign 400 may display the information (a color, a character, or an image) of the high severity and event details (e.g., accident between vehicles, vehicle breakdown, road control, ambulance driving, fire truck driving, exit warning, entry warning, and road conditions (soil runoff, oil spill, flooding, icing, pot hole, road kill, falling object, road construction, and tunnel collapse).

Figure 10:
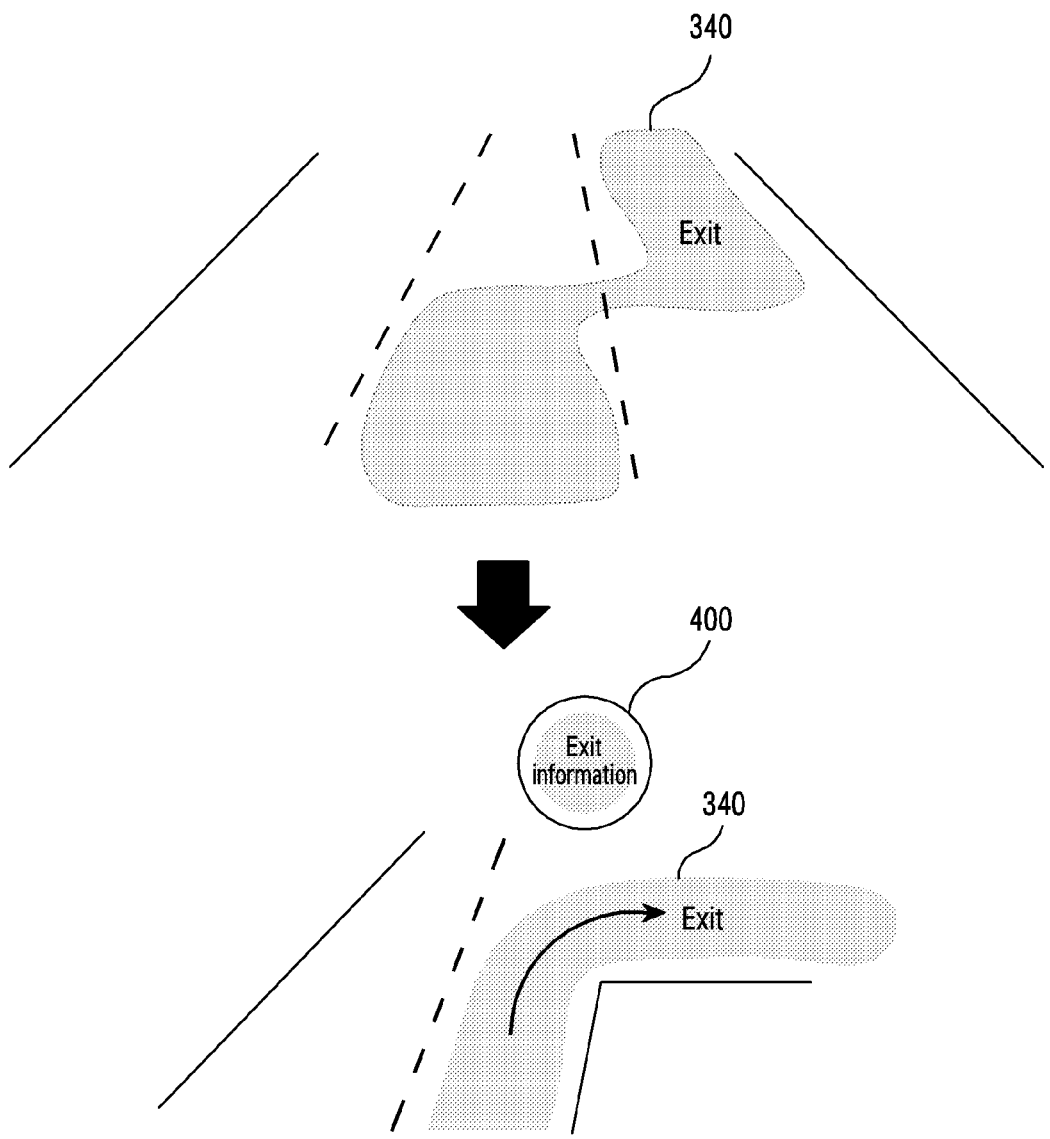
FIG. 10 is a diagram illustrating an example method for guiding a road exit based on traffic event occurrence according to road exit unawareness, and sudden lane changes of other vehicles according to various embodiments.

FIG. 10 is a diagram illustrating an example method for guiding a road exit based on event occurrence based on road exit unawareness and sudden lane changes of other vehicles according to various embodiments.

Referring to FIG. 3A, FIG. 4A, and FIG. 10, if sudden braking and sudden lane changes of other vehicles occur near the exit of the road, or other vehicles miss the exit and frequently deviate their driving route, the electronic device 100 may display an exit guide 340 in advance. The electronic device 100 may display the exit guide 340 if approaching a specific distance (e.g., 1 Km) from the exit. Also, the electronic device 100 may display the traffic sign 400 including exit information.

Figure 11:
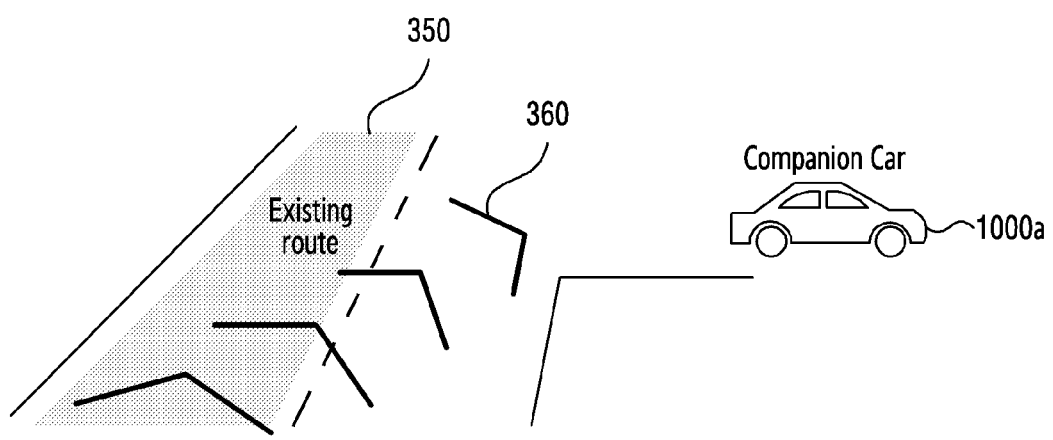
FIG. 11 is a diagram illustrating an example method for guiding a lane/route change according to lane/route deviation of a companion vehicle according to various embodiments.

FIG. 11 is a diagram illustrating an example method for guiding a lane/route change based on lane/route deviation of a companion vehicle according to various embodiments.

Referring to FIG. 3A, FIG. 4A, and FIG. 11, a plurality of companion vehicles for the same destination may set the same driving route, and the companion vehicles may travel together. A specific vehicle among the companion vehicles may change its lane or driving route, or enter a rest area irrespective of the driving route to the destination.

If the specific vehicle among the companion vehicles 1000a changes the lane or the driving route, or enters the rest area route regardless of the driving route to the destination, the electronic device 100 may display driving route information 360 of the companion vehicle 1000a together with the existing driving route 350. The electronic device 100 may display the driving route information 360 of the companion vehicle 1000a together with the existing driving route 350 on the display device if not only the companion vehicle 1000a travels ahead of the driver's own vehicle (e.g., the vehicle connected to the electronic device) but also the companion vehicle 1000a travels behind the driver's own vehicle. The driving route information 360 of the companion vehicle 1000a may be identically displayed in all of the companion vehicles. Thus, the companion vehicles may quickly and accurately recognize information that the specific vehicle of the companion vehicles deviates the driving route.

An electronic device according to various example embodiments of the present disclosure, may include: a communication module comprising communication circuitry, a processor operatively coupled to the communication module, and a memory operatively coupled to the processor. The memory may store instructions which, when executed, control the processor to: obtain driving route traffic information of a first driving route of a vehicle connected to the electronic device, analyze the first driving route traffic information and determine a traffic event occurrence requiring a change in a driving route or a driving lane of the vehicle connected to the electronic device, based on the traffic event occurring, determine a severity level of the traffic event based on a driving time increase and an accident risk, and control a display device to display at least one of line change information, lane change information and a traffic sign corresponding to the severity level on the display device.

The processor of the electronic device according to various example embodiments of the present disclosure may be configured to, while driving on the first driving route, determine the severity to be a first level based on the driving time increasing less than a first increment or there being no accident risk, and while driving on the first driving route, determine the severity to be a second level based on the driving time increasing over the first increment or an accident risk being expected.

The processor of the electronic device according to various example embodiments of the present disclosure may be configured to: acquire a current location of the vehicle connected to the electronic device, obtain a distance difference between the vehicle connected to the electronic device and an occurrence point of the traffic event, and control the display device to display at least one of the line change information, the lane change information and the traffic sign based on the distance difference.

The processor of the electronic device according to various example embodiments of the present disclosure may be configured to: control the display device to display at least one of first line change information, first lane change information and a first traffic sign corresponding to the severity of the first level on the display device.

The processor of the electronic device according to various example embodiments of the present disclosure may be configured to: control the display device to display the first driving route corresponding to the severity of the first level and a second driving route newly recommended on the display device.

The processor of the electronic device according to various example embodiments of the present disclosure may be configured to: control the display device to display the first driving route and the second driving route differently.

The processor of the electronic device according to various example embodiments of the present disclosure may be configured to: control the display device to display at least one of second line change information configured to force a change in the line, second lane change information configured to force a change in the lane and a second traffic sign on the display device in response to the severity of the second level.

The processor of the electronic device according to various example embodiments of the present disclosure may be configured to: control the display device to display the first driving route as an impossible driving route, and to display the second driving route newly recommended on the display device in response to the severity of the second level.

The processor of the electronic device according to various example embodiments of the present disclosure may be configured to: control the display device to display the first traffic sign and the second traffic sign in different colors.

The processor of the electronic device according to various example embodiments of the present disclosure may be configured to: classify types of the traffic event into accident between vehicles, vehicle breakdown, road control, ambulance driving, fire truck driving, exit warning, entry warning, soil runoff, oil spill, flooding, icing, pot hole, road kill, falling object, road construction, and tunnel collapse, and control the display device to display the traffic sign corresponding to the type of the traffic event on the display device.

The processor of the electronic device according to various example embodiments of the present disclosure may be configured to: control the display device to display at least one of the line change information, the lane change information and the traffic sign corresponding to the severity level in at least one of a flat display manner, two dimension augmented reality head up display (AR HUD) manner, a three dimension AR HUD manner, a virtual reality (VR) manner, and a hologram manner.

The processor of the electronic device according to various example embodiments of the present disclosure may be configured to: recognize driving routes of a plurality of companion vehicles for a same destination, and based on a specific vehicle among the plurality of the companion vehicles having the same destination changing the driving route regardless of the destination travel route, control the display device to display driving route changes of the specific vehicle on the display device.

A vehicular driving guidance method according to various example embodiments of the present disclosure may include: collecting driving route traffic information of a first driving route of a vehicle connected to an electronic device, analyze the first driving route traffic information and determine a traffic event occurrence requiring to change a driving route or a driving lane of the vehicle connected to the electronic device, based on the traffic event occurring, determine severity of the traffic event based on a driving time increase and an accident risk, and control a display device to display at least one of line change information, lane change information and a traffic sign corresponding to a level of the severity on a display device.

The vehicular driving guidance method according to various example embodiments of the present disclosure may include: while driving on the first driving route, determine the severity to a first level based on a driving time increasing less than a first increment or there being no accident risk, and in driving on the first driving route, determine the severity to a second level based on the driving time increasing over the first increment or an accident risk being expected.

The vehicular driving guidance method according to various example embodiments of the present disclosure may include: acquiring a current location of the vehicle connected to the electronic device, obtaining a distance difference between the vehicle connected to the electronic device and an occurrence point of the traffic event, and controlling the display device to display at least one of the line change information, the lane change information and the traffic sign based on the distance difference.

The vehicular driving guidance method according to various example embodiments of the present disclosure may include: controlling the display device to display at least one of first line change information, first lane change information and a first traffic sign corresponding to the severity of the first level on the display device, and control the display device to display the first driving route corresponding to the severity of the first level and a second driving route newly recommended on the display device.

The vehicular driving guidance method according to various example embodiments of the present disclosure may include, controlling the display device to display the first driving route and the second driving route differently.

The vehicular driving guidance method according to various example embodiments of the present disclosure may include: controlling the display device to display at least one of second line change information which forces to change the line, second lane change information which forces to change the lane and a second traffic sign on the display device in response to the severity of the second level, and controlling the display device to display the first driving route as an impossible driving route, and to display the second driving route newly recommended on the display device in response to the severity of the second level.

The vehicular driving guidance method according to various example embodiments of the present disclosure may include: controlling the display device to display the first traffic sign and the second traffic sign in different colors.

The vehicular driving guidance method according to various example embodiments of the present disclosure may include: recognizing driving routes of a plurality of companion vehicles for the same destination, and based on a specific vehicle among the plurality of the companion vehicles having the same destination changing the driving route regardless of the destination travel route, controlling the display device to display driving route changes of the specific vehicle on the display device.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalent. It will also be understood that any of the embodiment(s) described herein may be used in conjunction with any other embodiment(s) described herein.

What is claimed is:

1. An electronic device comprising:
communication circuitry;
at least one processor comprising processing circuitry; and
memory storing instructions,
wherein the instructions, when executed by the at least one processor individually and/or collectively, cause the electronic device to perform operations comprising:
obtaining driving route traffic information of a first driving route of a vehicle connected to the electronic device,
analyzing the first driving route traffic information and determining occurrence of a traffic event requiring a change in a driving route or a driving lane of the vehicle,
based on the traffic event occurrence, determining a severity level of the traffic event based on a driving time increase and an accident risk associated with the traffic event, and
controlling a display to display at least a traffic sign displaying severity level information and traffic event detail information,
wherein a position of the traffic sign on the display is based on a distance from a current location of the vehicle to an occurrence point of the traffic event, and
wherein a color of the traffic sign on the display is based on the severity level information.

2. The electronic device of claim 1, wherein memory stores instructions which, when executed by the at least one processor individually and/or collectively, cause the electronic device to perform operations comprising:
while driving on the first driving route, determining severity associated with the traffic event to be a first level based on the driving time increasing less than a first increment amount or no accident risk being identified, and
while driving on the first driving route, determining the severity associated with the traffic event to be a second level based on the driving time increasing over the first increment amount or an accident risk being identified.

3. The electronic device of claim 2, wherein memory stores instructions which, when executed by the at least one processor individually and/or collectively, cause the electronic device to perform operations comprising:
acquiring the current location of the vehicle,
obtaining a distance difference between the vehicle and an occurrence point of the traffic event, and
controlling a display to display the traffic sign based on the distance difference.

4. The electronic device of claim 2, wherein memory stores instructions which, when executed by the at least one processor individually and/or collectively, cause the electronic device to perform operations comprising:
controlling a display to display a first traffic sign corresponding to the severity of the first level.

5. The electronic device of claim 4, wherein memory stores instructions which, when executed by the at least one processor individually and/or collectively, cause the electronic device to perform operations comprising:
controlling the display to display the first driving route corresponding to the severity of the first level and a second driving route newly recommended.

6. The electronic device of claim 5, wherein memory stores instructions which, when executed by the at least one processor individually and/or collectively, cause the electronic device to perform operations comprising:
controlling the display to display the first driving route and the second driving route differently.

7. The electronic device of claim 4, wherein memory stores instructions which, when executed by the at least one processor individually and/or collectively, cause the electronic device to perform operations comprising:
controlling the display to display at least one of second line change information configured to force a change in line, second lane change information configured to force a change in lane, or a second traffic sign in response to the severity of the second level.

8. The electronic device of claim 7, wherein memory stores instructions which, when executed by the at least one processor individually and/or collectively, cause the electronic device to perform operations comprising:
controlling the display to display the first driving route as an impossible driving route, and to display a second driving route newly recommended on the display in response to the severity of the second level.

9. The electronic device of claim 7, wherein memory stores instructions which, when executed by the at least one processor individually and/or collectively, cause the electronic device to perform operations comprising:
controlling the display to display the first traffic sign and the second traffic sign in different colors.

10. The electronic device of claim 1, wherein memory stores instructions which, when executed by the at least one processor individually and/or collectively, cause the electronic device to perform operations comprising:
classifying types of the traffic event into accident between vehicles, vehicle breakdown, road control, ambulance driving, fire truck driving, exit warning, entry warning, soil runoff, oil spill, flooding, icing, pot hole, road kill, falling object, road construction, and tunnel collapse, and
controlling a display to display the traffic sign corresponding to the type of the traffic event on the display.

11. The electronic device of claim 1, wherein memory stores instructions which, when executed by the at least one processor individually and/or collectively, cause the electronic device to perform operations comprising:
controlling a display to display the traffic sign in at least one of a flat display manner, two dimension augmented reality (AR) head-up display (HUD) manner, a three dimension AR HUD manner, a virtual reality (VR) manner, or a hologram manner.

12. The electronic device of claim 1, wherein memory stores instructions which, when executed by the at least one processor individually and/or collectively, cause the electronic device to perform operations comprising:
recognizing driving routes of a plurality of companion vehicles for a same destination, and
based on a specific vehicle among the plurality of the companion vehicles having the same destination changing the driving route regardless of destination travel route, controlling a display to display driving route changes of the specific vehicle.

13. A vehicular driving guidance method comprising:
obtaining driving route traffic information of a first driving route of a vehicle connected to an electronic device;
analyzing the first driving route traffic information and determining occurrence of a traffic event requiring a change in a driving route or a driving lane of the vehicle;
based on the traffic event occurrence, determining a severity of the traffic event based on a driving time increase and an accident risk associated with the traffic event; and
controlling a display to display at least a traffic sign displaying severity level information and traffic event detail information,
wherein a position of the traffic sign on the display is based on a distance from a current location of the vehicle to an occurrence point of the traffic event, and
wherein a color of the traffic sign on the display is based on the severity level information.

14. The vehicular driving guidance method of claim 13, wherein determining severity level comprises:
while driving on the first driving route, determining the severity associated with the traffic event to be a first level based on the driving time increasing less than a first increment amount or no accident risk being identified, and
while driving on the first driving route, determining the severity associated with the traffic event to be a second level based on the driving time increasing over the first increment amount or an accident risk being identified.

15. The vehicular driving guidance method of claim 14, further comprising:
acquiring the current location of the vehicle,
obtaining a distance difference between the vehicle and an occurrence point of the traffic event, and
controlling a display to display the traffic sign based on the distance difference.

16. A non-transitory computer-readable storage medium storing instructions which, when executed by at least one processor of an electronic device, cause the electronic device to perform operations comprising:
obtaining driving route traffic information of a first driving route of a vehicle connected to the electronic device;
analyzing the first driving route traffic information and determining occurrence of a traffic event requiring a change in a driving route or a driving lane of the vehicle;
based on the traffic event occurrence, determining a severity of the traffic event based on a driving time increase and an accident risk associated with the traffic event; and
controlling a display to display at least a traffic sign displaying severity level information and traffic event detail information,
wherein a position of the traffic sign on the display is based on a distance from a current location of the vehicle to an occurrence point of the traffic event, and
wherein a color of the traffic sign on the display is based on the severity level information.

* * * * *